United States Patent Office.

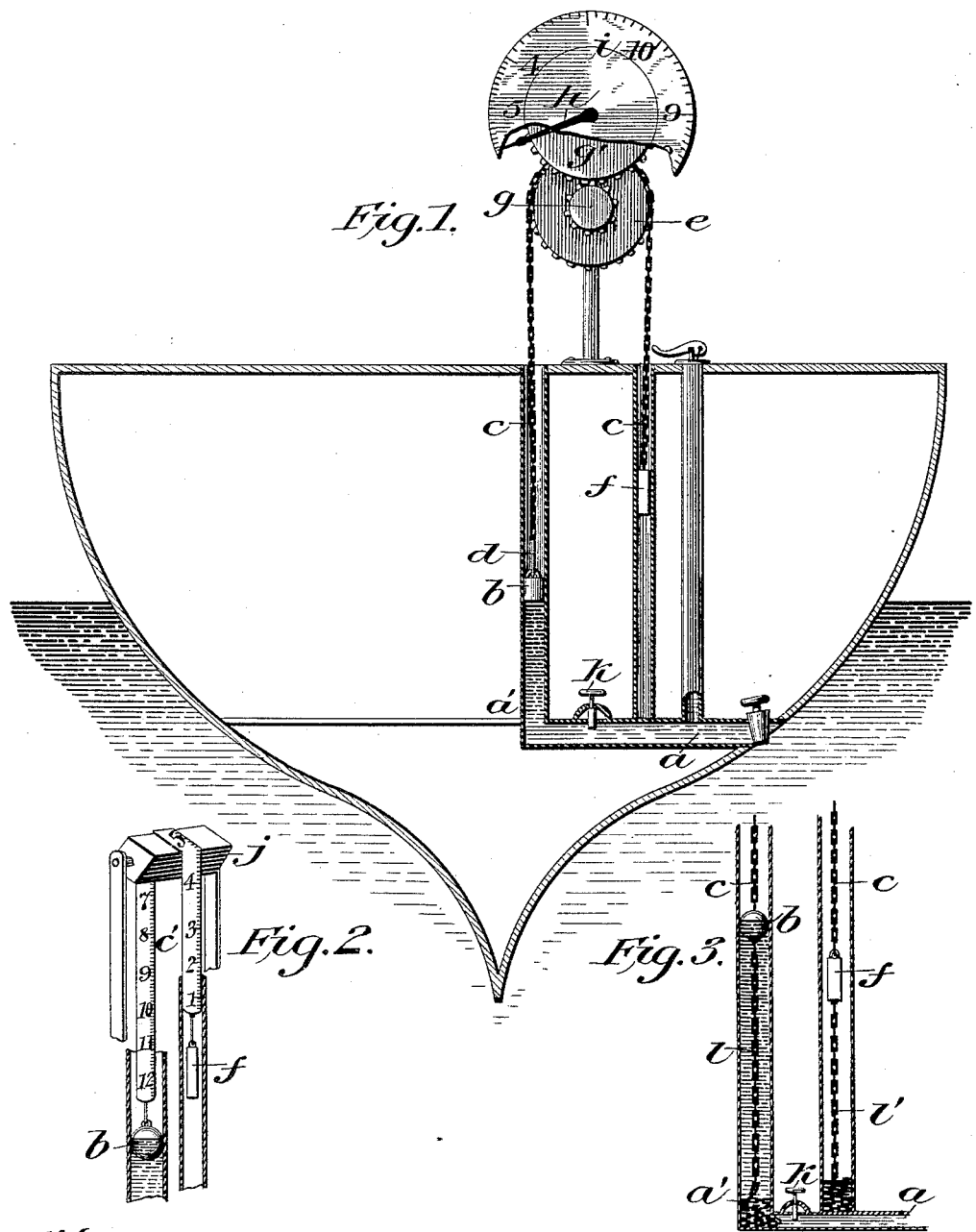

ROBERT C. PRINGLE, OF MARINE CITY, MICHIGAN.

DRAFT-INDICATOR FOR VESSELS.

SPECIFICATION forming part of Letters Patent No. 467,996, dated February 2, 1892.

Application filed October 13, 1890. Serial No. 368,049. (No model.)

*To all whom it may concern:*

Be it known that I, ROBERT C. PRINGLE, a citizen of the United States, residing at Marine City, in the county of St. Clair and State of Michigan, have invented a new and useful Vessel-Draft Indicator, of which the following is a specification.

My invention relates to indicators of an automatic nature, which will show at any and all times the depth of water a vessel is drawing. I attain this object by the mechanism illustrated in the accompanying drawings, in which—

Figure 1 is a cross-section of a vessel, showing the arrangement of the device as connected with the "sea-cock." Fig. 2 is a simpler form of an indicator. Fig. 3 shows the float and counter-balance with extra or compensating balances attached.

Similar letters refer to similar parts in all the views.

The want of some simple, accurate, and reliable device for indicating the depth of water a vessel is drawing while loading has long been a pressing want to the vessel-men of the Great Lakes on account of the shallowness of certain portions of those great water-ways which float a large portion of the world's products. For this reason the draft of its large vessels is limited, and as every inch of its possibilities to float deeply-laden vessels is taken great loss is often entailed by grounding on account of the want of accurate means of knowing just when the greatest depth of draft allowable is reached in loading.

In my device I make use of the sea-cock inlet-pipes fore and aft, (as indicators must be placed at both ends of a vessel,) or, in fact, of any pipe piercing the side or bottom of the vessel below the light-draft line. To do this I extend the inlet portion $a$ of the sea-cock into the indicator-well $a'$, which may be of wood or metal, round or square, and about four inches across. This well should be brought up to the main deck and the connections to the indicator properly inclosed. In this well, which necessarily holds an equal level of water with that outside, is a float $b$, of any proper shape or material, a hollow metal sphere or wooden block, and to which is attached a sprocket-chain $c$, either directly or by means of a wire $d$, leaving, however, more sprocket-chain than the difference in feet between the minimum and maximum drafts of the vessel. This chain runs over the sprocket-wheel $e$, which is placed at least high enough to allow the chain to cause one revolution of the hand $h$, while the other end is attached to a counter-balance $f$, which should be a little lighter than the combined weight of the float and that portion of the sprocket-chain between it and the top of the wheel when the vessel is in light draft. This weight should be properly boxed around to a bottom nearly as low down as the inlet-pipe, as shown in Fig. 1. On the inlet-pipe, between the sea-cock and the indicator-well, is a valve $k$ to close the connection when the vessel is in motion or whenever desired. Attached to the sprocket-wheel or centered on the same spindle is a small gear-wheel $g$, which sets in motion the larger one $g'$, to which is attached the indicator-hand $h$, which points to the proper figure indicating the draft on the circular or annular indicator-face $i$, fixed in the proper place for that purpose. It is only necessary that the figures should commence with the light-draft one, as shown on the face, Fig. 1. To illustrate proportions, if the sprocket-wheel were two feet in circumference, the small gear-wheel one and one-half inches in diameter and the larger one six inches, and the vessel's light draft three feet, then any draft up to eleven feet could be indicated by one revolution of the hand. The device may be made as light as clock-work; but as it may be deemed necessary in some cases to make it somewhat heavy and strong it might then require compensating balances $l\ l'$, attached to both weight and float, as shown in Fig. 3, being small chains fastened to the bottom of each, so that when the major portion of the sprocket-chain comes on the counterbalance side, as when the vessel sinks deep into the water, an equal length of compensating chain $l$ is taken up by the float and a corresponding portion of $l'$ laid on the bottom on the other side, thus preventing the lifting of the float out of the water, which otherwise might happen.

A simpler form of the device and one that will answer just as well in many cases is shown in Fig. 2. In this form an ordinary tape-line is attached to the float, running over an appropriate wheel or revolving block $j$, with a counter-balance sufficient to keep it taut. The depth of draft can be read from the figures of the tape-line, and thus dispense with the hand and indicator face, or a fine chain might be used with small metal tags attached, showing feet and quarters.

The device is too simple to need further explanation.

What I claim, and desire to secure by Letters Patent, is—

A vessel-draft indicator composed of a well connected with the water in which the vessel floats, a float therein, a sprocket chain and wheel, a counter-balance, and compensating balances, all substantially as shown, and for the purposes specified.

ROBERT C. PRINGLE.

Witnesses:
 GEO. W. CARMAN,
 FRANK S. PARKER.